United States Patent
Setoguchi et al.

(10) Patent No.: US 6,905,544 B2
(45) Date of Patent: Jun. 14, 2005

(54) MANUFACTURING METHOD FOR A CARBON NANOMATERIAL, A MANUFACTURING APPARATUS FOR A CARBON NANOMATERIAL, AND MANUFACTURING FACILITY FOR A CARBON NANOMATERIAL

(75) Inventors: Toshihiko Setoguchi, Nagasaki (JP); Yuichi Fujioka, Nagasaki (JP); Yoshihiko Tsuchiyama, Nagasaki (JP); Akinori Yasutake, Nagasaki (JP); Matsuhei Noda, Nagasaki (JP); Norihisa Kobayashi, Tokyo (JP); Ryoichi Nishida, Ikoma (JP); Hitoshi Nishino, Kawachinagano (JP); Katsuhide Okimi, Sakai (JP); Akihiro Hachiya, Ibaraki (JP)

(73) Assignees: Mitsubishi Heavy Industries, Ltd., Tokyo (JP); Osaka Gas Co., Ltd., Osaka (JP)

( * ) Notice: Subject to any disclaimer, the term of this patent is extended or adjusted under 35 U.S.C. 154(b) by 105 days.

(21) Appl. No.: 10/369,749

(22) Filed: Feb. 21, 2003

(65) Prior Publication Data

US 2004/0000697 A1 Jan. 1, 2004

(30) Foreign Application Priority Data

Jun. 26, 2002 (JP) ........................................ 2002-186291

(51) Int. Cl.$^7$ .......................... C30B 25/04; C30B 25/12; C30B 25/14
(52) U.S. Cl. .......................... 117/105; 117/79; 117/928; 117/929
(58) Field of Search ........................... 117/79, 105, 928, 117/929

(56) References Cited

U.S. PATENT DOCUMENTS

2004/0151654 A1    8/2004    Wei et al.

FOREIGN PATENT DOCUMENTS

| CN | 1327943 | 12/2001 |
|---|---|---|
| JP | 2003-146635 | 5/2003 |

OTHER PUBLICATIONS

Yao Wang et al., Agglomerated carbon nanotubes and its mass production in a fluidized–bed reactor, Proceedings of the Tsukubs Symposium on Carbon Nanotube in COM (CNT10); Tsukubs, JAP Oct. 3–5, 2001, vol. 323, No. 1–4, Oct. 3, 2001, pp. 327–329, XP002254672, Phys B Condens Matter; Physi B: Condensed Matter, Oct. 2002.

Guohua Luo et al., "Catalysts effect on morphology of carbond nanotubes prepared by catalytic chemical vapor deposition in a nano–agglomerate bed", Proceedings of the Tsukuba Symposium on Carbon Nanotube in COM (CNT10); Tsukuba, Japan, Oct. 3–5, 2001, vol. 323, No. 1–4, Oct. 3, 2001, pp. 31 317, XP002254673, Phys B Condens Matter; Physica B: Condensed Matter, Oct. 2002.

K. Hernadi et al., "Fe–Catalyzed Carbon Anaotube Formation", Carbon, Elsevier Science Publishing, New York, NY, US, vol. 34, No. 10, 1996, pp. 1249–1257, XP000634342, ISSN: 0008–6223.

Lijie Ci et al., "Preparation of carbon nanofibers by the floating catalyst method", Carbon, Elsevier Science Publishing, New York, NY, US, vol. 38, No. 14, 2000, pp. 1933–1937, XP004211939, ISSN: 0008–6223.

Cheol Jin IEEE et al., "Large–scale production of aligned carbon nanatubes by the vapor phase growth method", Chemical Physics Letters, Jun. 13, 2002, Elsevier, Netherlands, vol. 359, No. 1–2, pp. 109–114, XP002254674, ISSN: 0009–2614.

Primary Examiner—Felisa Hiteshew
(74) Attorney, Agent, or Firm—Wenderoth, Lind & Ponack, L.L.P.

(57) ABSTRACT

The invention has as an object proving a carbon nanomaterial fabrication method that can continuously mass-produce a high purity carbon a nanomaterial. The tube-shaped or fiber-shaped carbon nanomaterial having carbon as the main constituent is fabricated with a compound that includes carbon (raw material) and an additive that includes a metal by using a fluidized bed reactor.

18 Claims, 3 Drawing Sheets

1: FLUIDIZED BED REACTOR
2: FLUIDIZED BED REACTOR FURNACE
3: FLUIDIZED BED SECTION
4: FREE BOARD SECTION
10: CARBON NANOMATERIAL FABRICATION APPARATUS

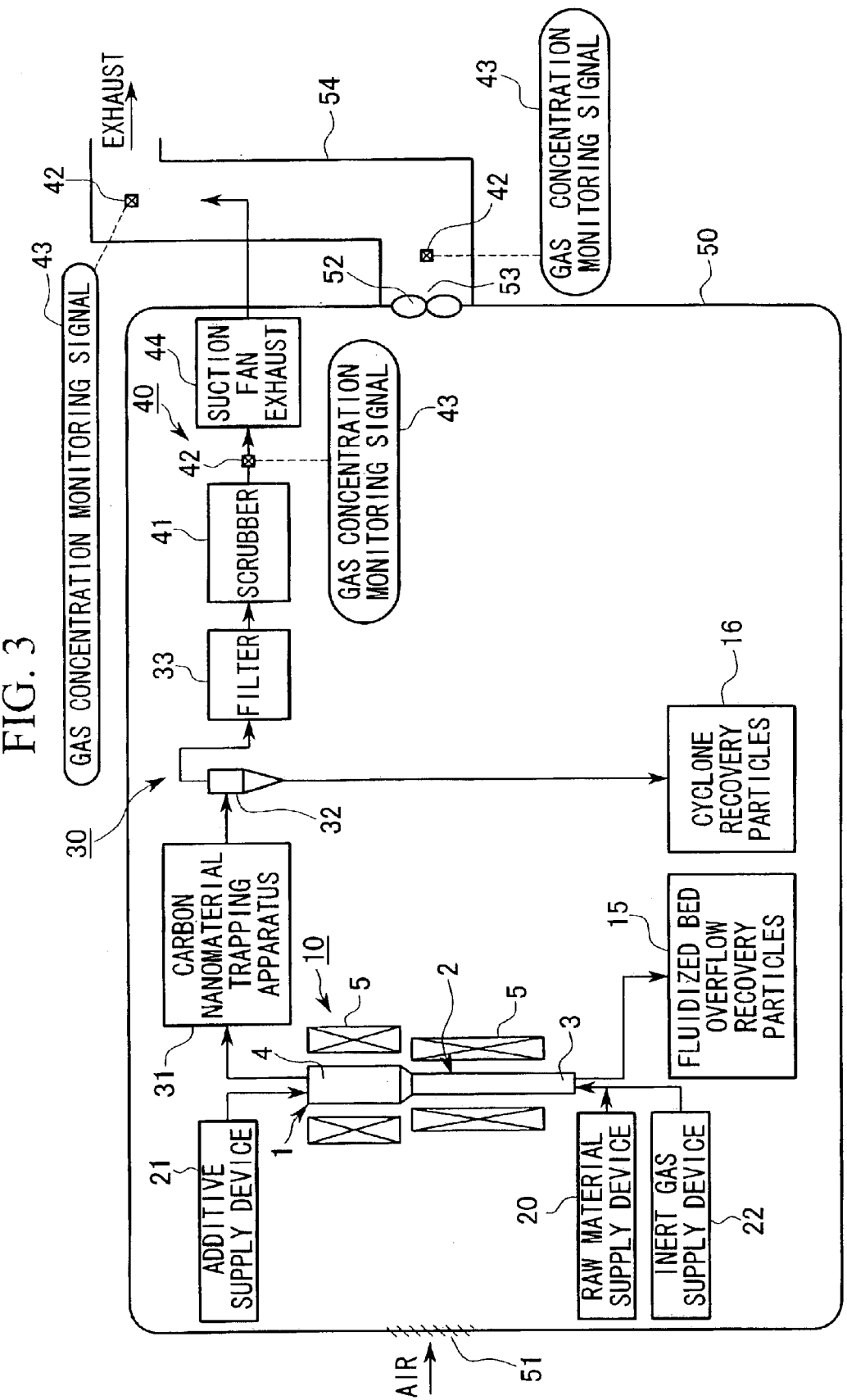

MANUFACTURING METHOD FOR A CARBON NANOMATERIAL, A MANUFACTURING APPARATUS FOR A CARBON NANOMATERIAL, AND MANUFACTURING FACILITY FOR A CARBON NANOMATERIAL

BACKGROUND OF THE INVENTION

1. Field of the Invention

The present invention relates to a carbon nanomaterial manufacturing method in which a tube-shaped material or a fiber-shaped material having carbon as a main constituent is fabricated, a carbon nanomaterial manufacturing apparatus, and a carbon nanomaterial manufacturing facility.

2. Description of the Related Art

In recent years, tube-shaped or fiber-shaped carbon nanomaterials having carbon as the main constituent have become the focus of attention. What have been termed carbon nanotubes and carbon nanofibers are known as examples of this type of carbon nanomaterial.

Among these, carbon nanotubes are tube-shaped carbon polyhedrons having a structure in which graphite sheets are closed into a cylindrical shape. These carbon nanotubes include multilayer nanotubes that have a multilayer structure in which graphite sheets are closed into a cylindrical shape, and monolayer nanotubes that have a monolayer structure in which a graphite sheet is closed into a cylindrical shape.

Multilayer nanotubes were discovered by Iijima in 1991. Specifically, it was discovered that multilayer nanotubes were present in a mass of carbon deposited on a negative electrode used in an arc discharge technique. Subsequently, investigations of multilayer nanotubes were aggressively pursued, and in recent years, it has become possible to synthesize multilayer nanotubes in large amounts.

In contrast, monolayer nanotubes have an internal diameter of about 4 to 100 nanometers (nm), and their synthesis was simultaneously reported in 1993 by Iijima and a group at IBM. The electronic state of the monolayer nanotubes was predicted theoretically, and it is thought that the electronic property changes from a metallic character to a semiconductor character due to the manner in which it folds into a spiral. Therefore, this type of monolayer nanotube has promise as a future electronic material.

Other uses of this monolayer nanotubes that can be considered are as nanoelectronic materials, electrolysis electron emitters, a highly aligned radiation source, a soft X-ray source, a one-dimensional conducting material, a high temperature conducting material, and a hydrogen absorbing material. In addition, it is thought that uses of monolayer nanotubes will further spread depending on functional grouping, metallic coating, and incorporation of foreign bodies.

In addition, carbon nanofibers also hold promise in uses such as hydrogen absorbing materials.

Conventionally, the monolayer nanotubes described above are fabricated by incorporating metals such as iron, cobalt, nickel, or lanthanum into a carbon rod and carrying out arc discharge. However, in this method of fabrication, in addition to monolayer nanotubes, multilayer nanotubes, graphite, and amorphous carbon are mixed into the product, and not only is the yield low, but there is variation in both the tube diameter and length of the monolayer nanotubes, and it is difficult to fabricate monolayer nanotubes having comparatively uniform tube diameter and length at a high yield.

Moreover, as a fabrication method for carbon nanotubes, in addition to the arcing method described above, a phase thermal decomposition method, a laser sublimation method, and a condensate phase electrolysis method have been proposed.

As described above, as a fabrication method for carbon nanotubes, the arcing method, the phase thermal decomposition method, the laser sublimation method, and the condensate phase electrolysis method have been proposed.

However, these fabrication methods are fabrication methods that are all at the experimental stage, and in particular, stable mass production is difficult because, for example, the yield of monolayer carbon nanotubes is low and continuous fabrication is not possible.

Thus, being keenly aware about the future possibilities of carbon nanotubes and carbon nanofibers, the development of carbon nanomaterial fabrication methods, carbon nanomaterial fabrication apparatuses, and a carbon nanomaterial fabrication facility is desired that can continuously fabricate carbon nanomaterials that are materials in a tube or fiber shape having carbon as the main constituent, and in particular, carbon materials that include carbon nanomaterials having a high purity, or in other words, can industrially mass produce carbon nanomaterials.

In consideration of the problems described above, it is an object of the present invention to provide a carbon nanomaterial fabrication method, carbon nanomaterial fabrication apparatus, and carbon nanomaterial fabrication facility that can continuously mass produce carbon nanomaterials.

SUMMARY OF THE INVENTION

The present invention employs the following devices to solve the problems described above.

A carbon nanomaterial fabrication method of the present invention is characterized in manufacturing carbon nanomaterials having a tube shape or a fiber shape with carbon as the main constituent by using a fluidized bed reactor, and using a compound that includes carbon and an additive that includes a metal.

In this case, the advantageous tube diameter or fiber diameter of the carbon nanomaterial is equal to or less than 100 nm.

According to this type of carbon nanomaterial fabrication method, because a fluidized bed reactor is used, the compound (raw material) that includes carbon and the additive that includes a metal can be stably and continuously supplied and it is possible to uniformly mix and heat both. Thus it is possible to maintain a suitable temperature, pressure, and retention time and thereby to continuously deposit a high purity carbon nanomaterial.

In the carbon nanomaterial fabrication method described above, it is preferable that the fluidized bed reactor comprises a fluidized bed reactor furnace filled with a fluidized medium having a specific gravity and particle diameter that are sufficiently larger than those of the carbon nanotubes, that at least a compound including carbon, an additive that includes a metal, and an inert gas are supplied into the fluidized bed reactor furnace, that the fluidized bed formed by the floating of the fluidized medium is maintained within a predetermined temperature range and a predetermined pressure range, and that the superficial velocity is set smaller than the minimum fluidization velocity of the fluidized medium.

According to the carbon nanotube fabrication method using this type of fluidized bed reactor, the temperature and pressure of the fluidized bed is maintained within a predetermined range, at least a compound including carbon, an additive including a metal, and an inert gas are supplied, and the superficial velocity is set larger than the minimum fluidization velocity of the fluidized medium. Thereby, a fluidized bed environment (temperature, pressure, retention time and the like) suitable for the deposition of a carbon nanomaterial can be provided, and it is possible to continuously and stably deposit a high purity carbon nanomaterial.

In the carbon nanomaterial fabrication method described above, preferably in the fluidized bed reactor, the upper exit gas velocity in the fluidized bed reactor furnace is set larger than the fluidized bed gas velocity.

According to this type of carbon nanomaterial fabrication method, the velocity of the gas at the fluidized bed reactor exit side is low, the thus the carbon nanomaterial can be efficiently separated from the fluidized medium having sufficiently large specific gravity and particle diameter. As a result, because the light carbon nanomaterial flows out of the furnace, in subsequent processes, it is possible to trap the carbon nanomaterial having a high purity, and in addition, a cleaning effect on the deposition or the like adhering to the wall surface of the fluidized bed reactor furnace is obtained due to the separated fluidized medium circulating in the furnace.

In the carbon nanomaterial fabrication method, a plurality of species having different minimum fluidization velocities can be preferably used as the fluidized medium, and thereby an advantageous reaction time can be guaranteed by adjusting the retention time and the like.

In the carbon nanomaterial fabrication method described above, the compound that includes carbon is preferably a material that includes carbon and thermodynamically deposits the carbon.

In addition, in the carbon nanomaterial fabrication method described above, the additive that includes a metal is preferably one or a plurality of compounds that include one of iron (Fe), nickel (Ni), and cobalt (Co).

The carbon nanomaterial fabrication apparatus of the present invention is characterized in providing a fluidized bed reactor wherein a tube or fiber shaped carbon nanomaterial having carbon as the main constituent is deposited by reacting a compound that includes carbon and an additive that includes a metal.

In this case, the advantageous tube diameter or fiber diameter of the carbon nanomaterial is equal to or less than 100 nm.

According to this type of carbon nanomaterial fabrication apparatus, because a fluidized bed reactor is provided, it is possible to supply stably and continuously the compound that includes carbon (raw material) and the additive that includes a metal to the fluidized bed reactor, it is possible to uniformly mix and heat both, it is possible to maintain a suitable temperature, pressure, and retention time, and thereby it becomes possible to continuously deposit a high purity carbon nanomaterial.

In the carbon nanomaterial fabrication apparatus described above, it is preferable that the fluidized bed reactor comprises a fluidized bed reactor furnace filled with a fluidized medium having a specific gravity and particle diameter that is sufficiently larger than those of the carbon nanomaterial, that at least a compound that includes carbon, an additive that includes a metal, and an inert gas are supplied to the fluidized bed reactor furnace, that the fluidized bed that is formed by the floating of the fluidized medium is maintained within a predetermined temperature range and a predetermined pressure range, and that the superficial velocity is set higher than the minimum fluidization velocity of the fluidized medium.

According to this type of carbon nanomaterial fabrication apparatus, the temperature and pressure of the fluidized bed is maintained within a predetermined range, the supply of at least a compound that includes carbon, an additive that includes a metal, and an inert gas is received into the fluidized bed reactor furnace, the superficial velocity is set larger than the minimum fluidization velocity of the fluidized medium, and thereby, a environment (temperature, pressure, and retention time) for a fluidized bed suitable for the deposition of a carbon nanomaterial is formed, and a high purity carbon nanomaterial can be obtained continuously and stably.

In the carbon nanomaterial fabrication apparatus described above, preferably the fluidized bed is a bubbling fluidized bed, and thereby, a retention time necessary to deposit the carbon nanomaterial can be sufficiently guaranteed.

In the carbon nanomaterial fabrication apparatus described above, preferably a free board part having a flow path cross-sectional area that is larger than the fluidized bed part is provided on the upper exit side of the fluidized bed reactor furnace. It it is thereby possible to adjust the gas velocity at the exit part so as to be lower than that of fluidized bed part, and it is possible to separate efficiently the carbon nanomaterials from the fluidized medium having specific gravities and particle diameters which are different from those of the carbon nanomaterials. As a result, the light weight carbon nanomaterial is trapped after flowing out of the furnace, and a cleaning effect for the deposition or the like that adheres to the wall surface is obtained due to the residual fluidized medium circulating through the furnace.

In the carbon nanomaterial fabrication apparatus described above, a plurality of species having differing minimum fluidization velocities can be preferably used as the fluidized medium, and thereby it is possible to guarantee a suitable reaction time by adjusting the retention time.

In the carbon nanomaterial fabrication apparatus described above, preferably the compound that includes carbon is a material that includes carbon and deposits the carbon thermodynamically.

In addition, in the carbon nanomaterial fabrication apparatus described above, preferably the additive that includes a metal is one or a plurality of compound that includes both of one of iron (Fe), nickel (Ni), or cobalt (Co).

A carbon nanomaterial fabrication facility of the present invention is characterized in providing: a carbon nanomaterial fabrication apparatus described above; a raw material supply device that continuously supplies a predetermined amount of a compound that includes carbon to the carbon nanomaterial fabrication apparatus; an additive supply device that continuously supplies a predetermined amount of an additive that includes a metal to the carbon nanomaterial fabrication apparatus; a gas supply device that continuously supplies a predetermined amount of an inert gas to the carbon nanomaterial fabrication apparatus; and a particle recovery device that recovers the carbon nanomaterial deposited by the carbon nanomaterial fabrication apparatus.

According to this type of carbon nanomaterial fabrication facility, to the carbon nanomaterial fabrication apparatus providing the fluidized bed reactor, the compound that includes carbon is continuously and stably supplied at a predetermined amount by the raw material supply device. The additive that includes metal is continuously and stably supplied at a predetermined amount by the additive supply device, and the inert gas is continuously and stably supplied at a predetermined amount by the gas supply device. It is thereby possible to uniformly mix and heat the compound that includes carbon (the raw material) and the additive that includes a metal, and trap and recover at high efficiency with the particle recovery device the high purity carbon nanomaterial by continuously depositing it. Therefore, an industrial mass production facility becomes possible that efficiently recovers high purity carbon nanomaterial by continuously depositing it.

In the carbon nanomaterial fabrication facility described above, preferably at least one of a carbon nanomaterial trapping apparatus, a cyclone, or a filter is provided as the particle recovery device, and thereby the carbon nanomaterial can be reliably and efficiently recovered.

In the carbon nanomaterial fabrication facility described above, preferably a discharge gas processing device is provided downstream of the particle recovery device, and thereby, for example, even if a harmful gas is generated, such as a chlorine discharge gas, it is possible to release it to the atmosphere after suitable processing.

In the carbon nanomaterial fabrication facility described above, preferably a harmful gas concentration in the discharged gas is detected by providing a gas concentration detecting device and operation control is carried out by associating a detection signal for the harmful gas concentration. Thereby, in the case that a harmful gas is detected, suitable safety processing can be implemented, such as stopping the operation of the facility and sounding a warning.

In the carbon nanomaterial fabrication apparatus described above, preferably the entire facility is accommodated in a closed space provided with a ventilation device, and thereby, in the worst case, even if a harmful gas is generated, the amount that is discharged to the outside can be reduced to a minimum.

BRIEF DESCRIPTION OF THE DRAWINGS

FIG. 3 is a structural drawing showing a carbon nanomaterial fabrication method as a third embodiment of the present invention.

DESCRIPTION OF THE PREFERRED EMBODIMENTS

Below, embodiments of the carbon nanomaterial fabrication method, the carbon nanomaterial fabrication apparatus, and the carbon nanomaterial fabrication facility will be explained with reference to the figures.

The carbon nanomaterial is a tube or fiber-shaped material, and in particular, preferably it is a material for which the tube diameter or the fiber diameter are extremely small, being equal to or less than 100 nm. In this case, the ratio of the carbon, which is the main constituent, is equal to or greater than 70% by weight, and preferably equal to or greater than 80% by weight, more preferably equal to or less than 90%, and yet more preferably equal to or greater than 99% by weight. Other than this main constituent, there are no particular limitations on the constituents, and generally, these will comprise the catalyst constituent necessary for syntheses, such as cobalt, nickel or the like, in addition to the constituents mixed in as impurities from apparatus structural materials, and boron, aluminum, silicon, nitrogen, and halogens, which have a high affinity for carbon.

Moreover, the tube-shaped carbon nanomaterial described above is referred to as a carbon nanotube (CNT), and in addition, the fiber-shaped carbon nanomaterial described above is referred to as a carbon nanofiber.

First Embodiment

Figure 1:
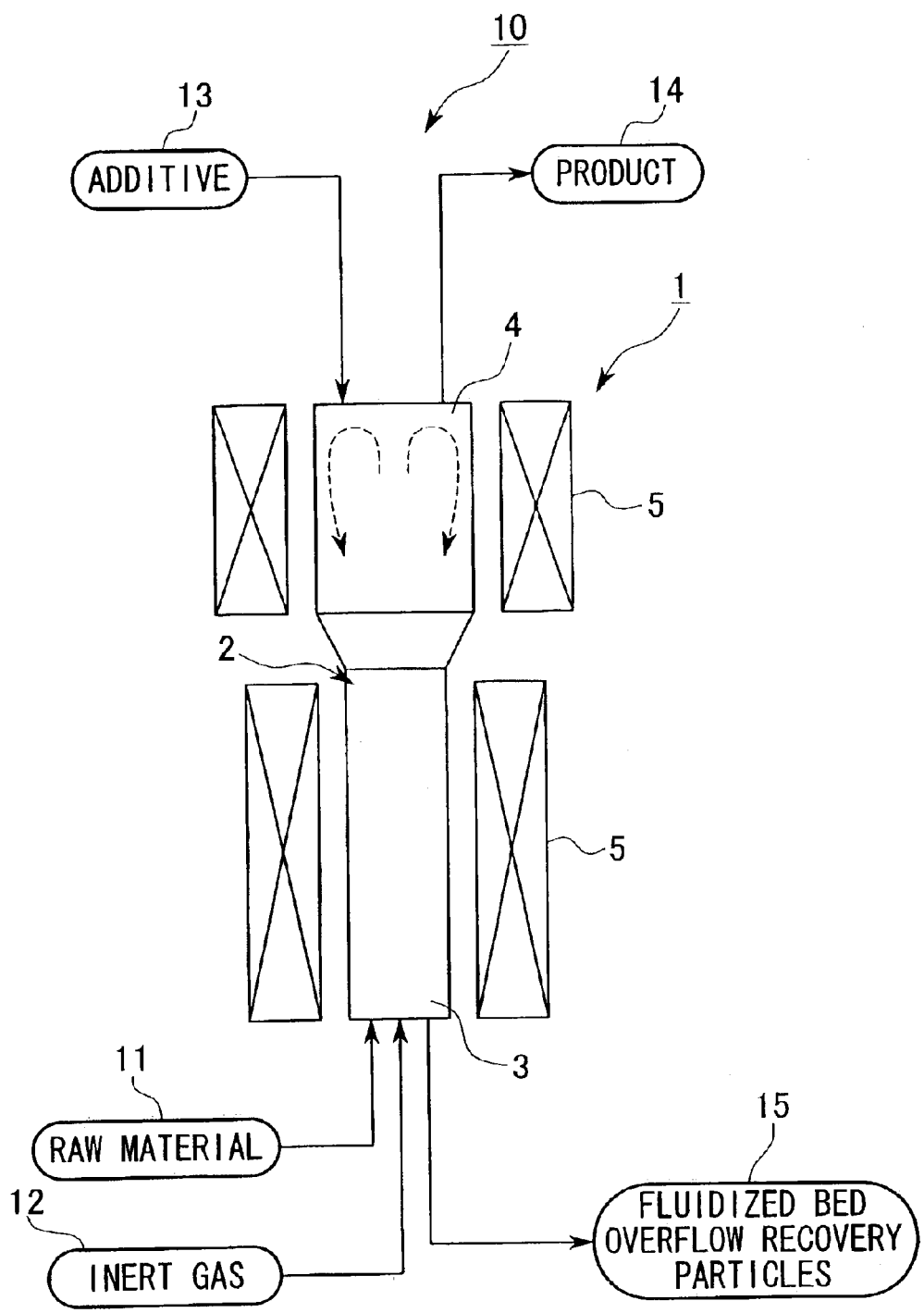
FIG. 1 is a structural drawing showing a carbon nanomaterial fabrication method as a first embodiment of the present invention.

FIG. 1 is a structural diagram showing a carbon nanomaterial fabrication apparatus 10 that is the first embodiment of the present invention. Reference numeral 1 denotes a fluidized bed reactor, 2 denotes a fluidized bed reactor furnace, 3 denotes a fluidized bed section, 4 denotes a free board section, 5 denotes a heating device, and 10 denotes the carbon nanomaterial fabrication apparatus.

The fluidized bed reactor 1 is structured comprising free board section 4 that communicates with the upper part of the fluidized bed section 3, and providing a heating device 5 such as an electric heater or gas heater around the fluidized bed reactor furnace 2 comprising the fluidized bed section 3 and the free board section 4. Moreover, there is a bubbling fluidized bed and a turbulent fluidized bed in the fluidized bed reactor 2, and either one can be used.

The fluidized bed reactor furnace 2 uses, for example, a material that effects a chromizing process on a Ni alloy, and is a furnace formed as a longitudinally cylindrical vessel. In this fluidized bed reactor furnace 2, the cross-sectional area of the free board section 4 is larger than the cross-sectional area of the fluidized bed section 3.

The inside of the fluidized bed reactor furnace 2 is filled with a fluidized medium having a specific gravity and particle diameter sufficiently larger than those of the carbon nanomaterial. Metal particles of Ni, Cu, Fe, Co, Cr, or the like, particles that include these metals, or particles such as graphite carbon, or particles such as quartz sand and aluminum oxide (alumina) are examples of a suitable fluidized medium to be used here. In addition, the fluidized medium used is not actually limited to one particle species, and it is also possible to combine (mix) from among the particles described above two or more species having differing specific gravities or particle diameters.

Pipes that communicate with a raw material supply device and an inert gas supply device (not illustrated) are connected to the bottom of the fluidized bed reactor furnace 2, that is, the bottom of the fluidized bed section 3. The raw material supply device and the inert gas supply device respectively continuously supply at predetermined amounts gasified raw material 11 and inert gas 12 into the fluidized medium that fills the inside of the fluidized bed reactor furnace 2.

A compound that includes carbon, or more preferably, a material that includes carbon and in which the carbon is thermodynamically deposited, may be used as a raw material for the carbon nanomaterial. Concrete examples of the raw material include aromatic compounds such as benzene, toluene, or the like, unsaturated organic compounds such as alkanes including methane, ethane, propane, hexane or the like, ethylene, propylene, and acetylene, high molecular materials that include halogens such as polytetrafluoroethylene (PTFE), polyvinylidene fluoride, or the like, freon gases such as $C_2F_6$, and petroleum and coal (including coal converted gasses).

These raw materials have different states of solid, liquid, and gas under temperature and atmospheric pressure, but appropriate heat processing or the like can be carried out using pre-treatment that is provided depending on necessity, and gasified compounds can be used as the raw material.

Gases that contribute nothing to the reaction between the raw material and the additives described below in the fluidized bed reactor furnace 2 are used as the inert gas. In addition to nitrogen gas, rare gases such as argon can be used here as the inert gas.

At the same time, a pipe that communicates with an additive supply device (not, illustrated) is connected to the upper section of the fluidized bed reactor furnace 2. The additive supply device can continuously supply at a predetermined amount an additive 13 that includes a metal into the fluidized bed reactor furnace 2. As an example in the figure, the pipe for the additive supply is provided along with an exit pipe for a product 14 on the upper edge of the free board section 4 formed such that the diameter of the upper part of the fluidized bed section 3 increases.

Compounds that include Fe are preferably used as the additive that includes a metal as described above, and concretely include iron chlorides such as $FeCl_3$, $FeCl_2$ or the like and their hydrates, iron oxides such as FeO, $Fe_3O_4$, $Fe_2O_3$ or the like, and metal complexes such as ferrocene, iron carbonyl and the like. Furthermore, instead of Fe, compounds that include metals such as Ni, Co, or the like can be used.

Moreover, with regards to the path through which the additive is supplied to the interior of the fluidized bed reactor furnace 2, the raw material can not only be supplied separately from the upper part of the furnace as described above, but, for example, can be supplied by an air current conveyance from the bottom of the furnace, or can be supplied together with the raw material after being dissolved therein. A suitable choice can be made depending on the conditions such as the additive used and the combination of raw materials.

In the fluidized bed reactor furnace 2 into which the raw material, the additive, and the inert gas are supplied, the interior fluidized bed is maintained within a predetermined temperature range and a predetermined pressure range.

The differing heating temperatures of the fluidized bed can be optimally chosen from a temperature range between 500° C. and 1200° C., depending on the conditions such as the raw material and the additive used. By controlling the heating means 5, the optimal temperature can be maintained such that it is restricted within a predetermined temperature range that is very small compared to the temperature range given above. Specifically, the fluctuation range of the temperature is controlled extremely finely so as to maintain a constant selected optimal temperature.

In addition, differing optimal pressures for the fluidized bed can optimally chosen from a pressure range between a sub-atmospheric pressure to 0.49 Pa (5 Kfg/cm$^2$) depending on the conditions such as the raw material and the additive used. By controlling the amount of gas and the like supplied from the inert gas supply device 12, this optimal pressure can be maintained such that it is restricted within a temperature range that is extremely small in comparison to the pressure range given above. Specifically, the fluctuation range of the pressure is controlled extremely finely so as to maintain a constant selected optimal pressure.

The differing optimal values of the superficial velocity of the fluidized bed can be selected from a range of 2 to 8 times, where the minimum fluidization velocity (Umf) of the fluidized medium that is used is a standard depending on the conditions such as the raw material and the additive used, and set to a large value. Specifically, the superficial velocity is set to a gas velocity 2 to 8 times the minimum fluidization velocity. The selected optimal value of this superficial velocity is mainly maintained at a constant by controlling the amount of gas or the like supplied as the inert gas 12.

Below, the use of the carbon nanomaterial fabrication apparatus 10 described above will be explained along with the carbon nanomaterial fabrication method using this apparatus.

The fluidized medium that fills the interior of the fluidized bed reactor furnace 2 floats upwards from the bottom of the fluidized bed section 3 due to the gas of the raw material 11 and the inert gas 12 supplied into the furnace, and a fluidized bed having a predetermined temperature and a predetermined pressure is formed inside the fluidized bed section 3. Moreover, in the case that an additive is supplied by air current conveyance from the bottom of the fluidized bed reactor furnace 2, this flow can also contribute to floating the fluidized medium.

In this fluidized bed, the gas of the raw material (the compound that includes carbon) 11 and the additive 13 are uniformly mixed, and while being heated along with the fluidized medium at an optimal superficial velocity, they rise up taking a sufficient retention time. During this rising process, the gas of the raw material reacts with the additive, and a high purity carbon nanomaterial is continuously and stably produced and deposited.

In the fabrication method using the fluidized bed reactor 1 in this manner, the deposited carbon nanomaterial rises to the free board section 4 along with the fluidized medium. At the free board section 4, the gas velocity decreases due to the increase in the cross-sectional area, and thereby the lightweight carbon nanomaterial having a small particle diameter separates from the fluidized medium and rises further to flow out to the outside of the furnace from the exit piping.

At the same time, because the specific gravity and particle diameter of the fluidized medium is larger than those of the carbon nanomaterial, the main current after separation (shown by the hatched arrow in FIG. 1) falls along the free board section 4 and the inner wall surface of the fluidized bed section 3, and a cleaning effect, in which the product that adheres to the wall surface is scraped off, is exhibited. Therefore, even the carbon nanomaterial that has adhered to the wall surface is floated again after being scraped off from the wall surface and flows out from the exit piping, and thereby the recovery rate of the deposited carbon nanomaterial can be improved.

Moreover, reference numeral 15 in the figures denotes a fluidized bed overflow recovery particles, and the yield can be improved by recovering them by a suitable device because it is possible that carbon nanomaterial is included among these.

In addition, by providing the free board section 4, the rising time in the furnace is lengthened and the retention time is increased, and thereby the reaction time is lengthened by an equivalent amount, and it is possible to deposit at high efficiency highly pure carbon nanomaterial. Moreover, increasing the retention time in this manner is also possible by adjusting the specific gravity and particle diameter by the selection of the fluidized materials and mixing a plurality of fluidized materials.

In this manner, by using a fabrication method and a fabrication apparatus that generates and deposits carbon nanomaterial using the fluidized bed reactor 1, it is possible to provide easily an environment for depositing the carbon nanomaterial that can maintain an optimally constant temperature, pressure, and superficial velocity (that is, retention time). Thereby, due to continuously supplying the raw material and additive, the carbon nanomaterial is continuously and stably produced, and thereby industrial mass production can be realized.

It should be noted that in the fabrication method and fabrication apparatus for carbon nanomaterial described above, a fluidized bed reactor 1 is used that provides a free board section 4 having a diameter wider than the fluidized bed section 3, but this free board section 4 is added to the free board normally provided on the fluidized bed section 3 with the general object of lengthening the retention time, and therefore does not necessarily have to be provided.

In addition, a bubbling fluidized bed that makes guarantying the retention time easy is preferable as the fluidized bed for the fluidized bed reactor 1, but depending on the combination of raw material, additives, or the like and the conditions, a turbulent (circulating) fluidized bed in which the fluidized medium temporarily flows outside of the furnace can also be used.

Second Embodiment

Figure 2:
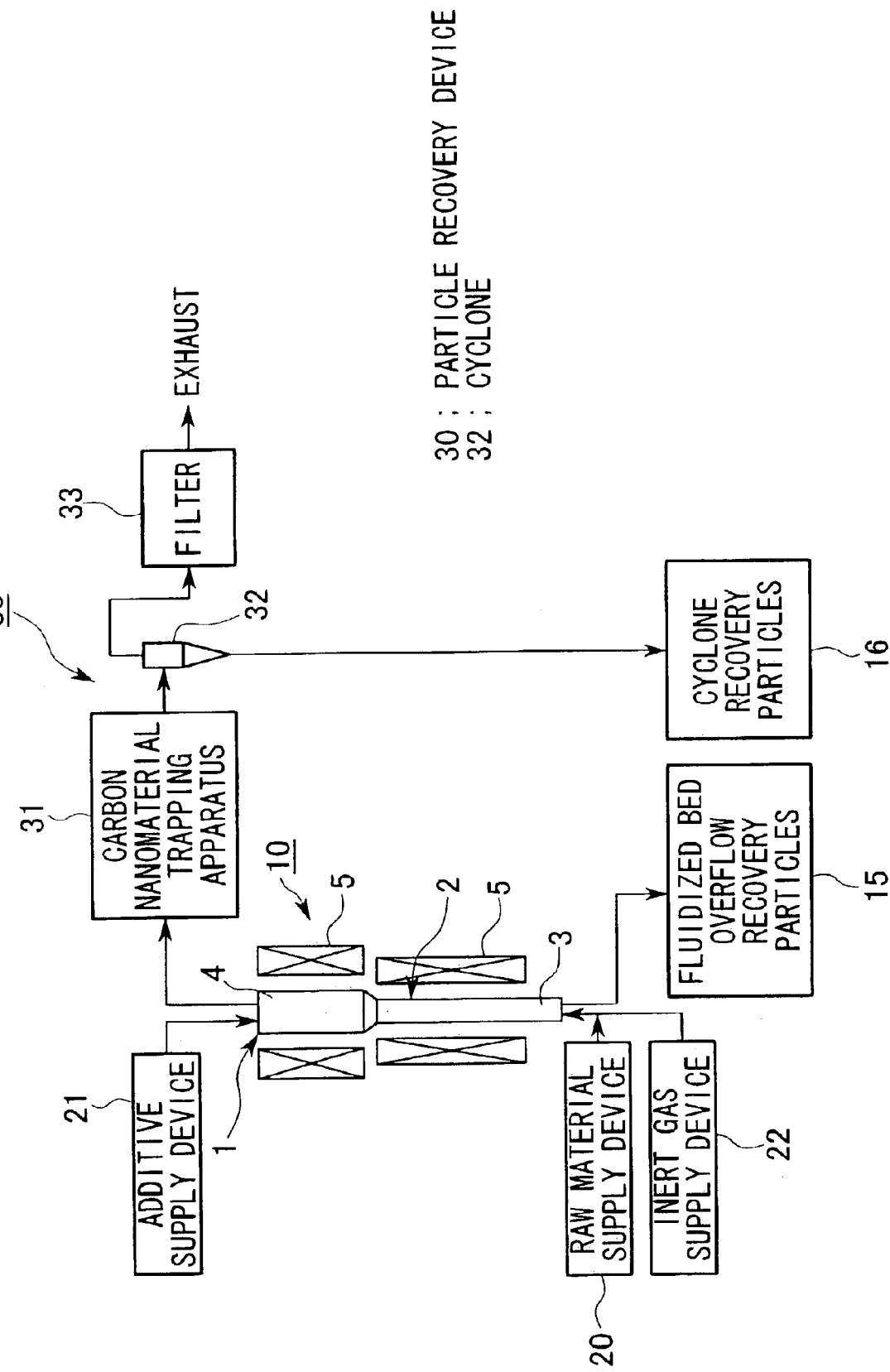
FIG. 2 is a structural drawing showing a carbon nanomaterial fabrication method as a second embodiment of the present invention.

Next, as a second embodiment of the present invention, a carbon nanomaterial fabrication facility using the carbon nanomaterial fabrication apparatus and the fabrication method described above will be explained with reference to FIG. 2. Moreover, parts identical to those of the carbon nanomaterial fabrication apparatus shown in FIG. 1 are denoted by identical reference numbers.

This fabrication facility comprises the carbon nanomaterial fabrication apparatus 10 described above, a raw material supply device 20 that continuously and stably supplies at a predetermined amount a compound that includes carbon to the carbon nanomaterial fabrication apparatus 10, an additive supply device 21 that continuously and stably supplies at a predetermined amount an additive that includes a metal to the carbon nanomaterial fabrication apparatus 10, a gas supply device 22 that continuously supplies at a predetermined amount an inert gas to the carbon nanomaterial fabrication apparatus 10, and a particle recovery device 30 that recovers the carbon nanomaterial that deposits in the carbon nanomaterial fabrication apparatus 10.

In this embodiment, as a particle recovery device 30, a carbon nanomaterial trapping apparatus 31, a cyclone 32, and a filter 33 are provided downstream of the exit piping that discharges the product from the carbon nanomaterial fabrication apparatus 10.

The carbon nanomaterial trapping apparatus 31 is one wherein a gap is provided between a plurality of plates that serve as the trapping plates, and the product (a gas flow that includes the deposition of the carbon nanomaterial) flows out from the carbon nanomaterial fabrication apparatus 10. The product that passes through the carbon nanomaterial trapping apparatus 31 is trapped due to the particles such as the carbon nanomaterial adhering because of colliding with the trapping plates, or is trapped by the particles such as carbon nanomaterial separating from the gas flow due to declining speed when passing between the gaps.

The cyclone 32 has the capacity to separate the particles from the gas included in the product by using centrifugal force. The particles such as carbon nanomaterial separated by the cyclone 32 are recovered from the cyclone bottom, and become cyclone recovery particles 16.

The filter 33 finally recovers the particles such as the carbon nanomaterial from the product that has passed through the carbon nanomaterial trapping apparatus 31 and the cyclone 32. The gas flow that passes through this filter 33 is discharged to the atmosphere or the like as exhaust.

According to the carbon nanomaterial fabrication apparatus having this structure, predetermined amounts of the raw material, additive, and inert gas are supplied continuously to the fluidized bed reactor 1 from the raw material supply device 20, the additive supply device 21, and the inert gas supply device 22, and high purity carbon nanomaterial is stably deposited.

In addition, the carbon nanomaterial that deposits in the fluidized bed reactor 1 flows to the outside of the furnace from the exit piping as product, and initially is separated and recovered from the gas flow by the carbon nanomaterial trapping apparatus 31. The carbon nanomaterial that is not recovered here is guided to the cyclone 32 along with the gas flow, and the carbon nanomaterial separated from the gas flow by centrifugal force is recovered as the cyclone recovered particles 16. Finally, the carbon nanomaterial that flows out with the gas flow from the cyclone 32 is trapped when passing through the filter 33.

The carbon nanomaterial that has been deposited by the fluidized bed reactor 1 includes particles trapped in the carbon nanomaterial trapping apparatus 31, the cyclone recovery particles, the particles trapped in the filter 33, and the fluidized bed overflow recovered particles 15, and thus by selecting only the necessary carbon nanomaterial particles from these recovered particles 16, it is possible to attain a high recovery yield. Therefore, it is possible to implement industrially stable mass production wherein carbon nanomaterial is continuously deposited and reliably recovered at a high yield.

Moreover, in the present invention, as a particle recovery device 30, the carbon nanomaterial trapping apparatus 31, the cyclone 32, and the filter 33, representing three types, are arranged by being serially connected, but depending on the condition of the product, the target recovery yield or the like, it is possible to carry out appropriate modifications such as providing at least one among the three types.

Third Embodiment

Finally, as a third embodiment of the present invention, a carbon nanomaterial fabrication facility using the carbon nanomaterial fabrication apparatus and the fabrication method described above, in particular, in the case that harmful chlorine constituents or the like are included in the product, will be explained with reference to FIG. 3. Moreover, parts identical to those of the carbon nanomaterial fabrication apparatus shown in FIG. 1 are denoted by identical reference numbers.

This fabrication facility comprises the carbon nanomaterial fabrication apparatus 10 described above, a raw material supply device 20 that continuously and stably supplies at a predetermined amount a compound that includes carbon to the carbon nanomaterial fabrication apparatus 10, an additive supply device 21 that continuously and stably supplies at a predetermined amount an additive that includes a metal to the carbon nanomaterial fabrication apparatus 10, a gas supply device 22 that continuously supplies at a predetermined amount an inert gas to the carbon nanomaterial fabrication apparatus 10, a particle recovery device 30 that recovers the carbon nanomaterial that is deposited in the carbon nanomaterial fabrication apparatus 10, and an exhaust gas processing device 40 that is provided downstream of the particle recovery device 30.

A scrubber 41 that desalinates the chlorine constituent is a concrete example of the exhaust gas processing device 40. Moreover, the desalination method is not limited to the scrubber 41, and of course other methods and apparatuses can be used. In the case that constituents other than chlorine are included, appropriate well-known processing devices can be combined as convenient.

In addition, downstream of the scrubber 41, a gas concentration detecting device 42 is provided and the concentration of the harmful gas in the exhaust gas is detected. The gas concentration monitoring signal 43 detected here is used for operational control that operates the carbon nanomaterial fabrication facility. Here, a concrete example of operation control is implementing the output of a warning, the stoppage of the operation of the facility, stopping the discharge of the exhaust gas, or the like in the case that the gas concentration monitoring signal 43 has detected a harmful gas.

As a more preferable embodiment, the entire facility is accommodated in a closed space 50 provided with a ventilation device. In the case of a large-scale facility, the closed space 50 is provided a ventilation device in a steel-reinforced concrete or steel plate structure, and uses a polycarbonate case to provide a ventilation device in the case that the entire facility is small-scale. Moreover, the polycarbonate is a flame-resistant resin, for example, and can also be used as a material in the case that an observation hole is provided in the closed space of the steel-reinforced concrete or steel plate structure.

The ventilation device provided in the closed space 50 comprises an exhaust gas opening 53, a section opening 51 and a discharge fan 52, and provides an exhaust gas duct 54 on the exhaust opening 53 depending on necessity. In addition, the exhaust gas that has been desalinized in the scrubber 41 is discharged into a direct exhaust gas duct 54 by the action of a suction fan 44.

On the exhaust gas duct 54, a gas concentration detecting device 42 is disposed at a suitable location, and harmful gas concentration in the exhaust gas is detected identically to that provided downstream of the scrubber 41. The gas concentration monitoring signal 43 output in this manner is used in the operation control of the carbon nanomaterial fabrication facility in the same manner.

According to this type of structure, not only the generation of harmful gas that generally causes a decrease in the capacity of the scrubbers 41, but also harmful gas that leaks downstream of the fluidized bed reactor 1 is reliably detected, and it is thereby possible to prevent it from flowing out to the outside of the closed space 50.

Therefore, it is possible to safely implement stable industrial mass production in which carbon nanomaterial is continuously deposited and a high yield is reliably recovered.

Moreover, the structure of the present invention is not limited by the embodiments described above, but can be suitably modified within a range without departing from the gist of the present invention.

What is claimed is:

1. A carbon nanomaterial fabrication method comprising:
   fabricating a carbon nanomaterial having a tube shape or a fiber shape with carbon as a main constituent with a compound that includes carbon and an additive that includes a metal by using a fluidized bed reactor, wherein the fluidized bed reactor comprises a fluidized bed reactor furnace filled with a fluidized medium having a specific gravity and particle diameter sufficiently larger than those of the carbon nanomaterial being fabricated;
   wherein at least the compound that includes carbon, the additive that includes a metal and an inert gas are supplied into the fluidized bed reactor furnace;
   wherein the fluidized bed, formed by floating of the fluidized medium, is maintained within a predetermined temperature range and a predetermined pressure range; and
   wherein the superficial velocity is set larger than the minimum fluidization velocity of the fluidized medium.

2. The carbon nanomaterial fabrication method of claim 1, wherein the carbon nanomaterial fabricated by said fabricating comprises carbon nanotubes or carbon fibers having a tube diameter or fiber diameter equal to or less than 100 nm.

3. The carbon nanomaterial fabrication method of claim 1, wherein a plurality of species having different minimum fluidization velocities are used as the fluidized medium.

4. The carbon nanomaterial fabrication method of claim 1, wherein the additive that includes a metal is one or a plurality of compounds that include one or a plurality of iron (Fe), nickel (Ni) and cobalt (Co).

5. A carbon nanomaterial fabrication method in which a carbon nanomaterial having a tube shape or a fiber shape with carbon as a main constituent is fabricated with a compound that includes carbon and an additive that includes a metal by using a fluidized bed reactor, including:
   the fluidized bed reactor comprising a fluidized bed reactor furnace inside the fluidized bed reactor; and
   an upper exit gas velocity in fluidized bed reactor furnace being smaller than the fluidized bed gas velocity.

6. A carbon nanomaterial fabrication method in which a carbon nanomaterial having a tube shape or a fiber shape with carbon as a main constituent is fabricated with a compound that includes carbon and an additive that includes a metal by using a fluidized bed reactor, wherein the compound that includes carbon is a material that includes carbon and thermodynamically deposits the carbon.

7. A carbon nanomaterial fabrication apparatus comprising:
   a fluidized bed reactor in which a tube or fiber shaped carbon nanomaterial having carbon as a main constituent is fabricated by reacting a compound that includes carbon and an additive that includes metal;
   wherein said fluidized bed reactor comprises a fluidized bed reactor furnace which is filled with a fluidized medium having a specific gravity and particle diameter that is sufficiently larger than those of the carbon nanomaterial being fabricated;
   at least a compound that includes carbon, an additive that includes a metal and an inert gas supplied to said fluidized bed reactor furnace;
   wherein said fluidized bed reactor is operable to maintain a fluidized bed, formed by floating of said fluidized medium, within a predetermined temperature range and a predetermined pressure range; and
   said fluidized medium has the superficial velocity thereof set higher than the minimum fluidization velocity thereof.

8. The carbon nanomaterial fabrication apparatus of claim 4, wherein a tube diameter or fiber diameter of the carbon nanomaterial is equal to or less than 100 nm.

9. A carbon nanomaterial fabrication apparatus comprising:
   a fluidized bed reactor in which a tube or fiber shaped carbon nanomaterial having carbon as a main constituent is fabricated by reacting a compound that includes carbon and an additive that includes metal;
   wherein said fluidized bed reactor comprises a fluidized bed reactor furnace which is filled with a fluidized medium having a specific gravity and particle diameter that is sufficiently larger than those of the carbon nanomaterial being fabricated;
   at least a compound that includes carbon, an additive that includes a metal and an inert gas supplied to said fluidized bed reactor furnace;
   a fluidized bed, formed by floating of said fluidized medium, maintained within a predetermined temperature range and a predetermined pressure range;
   the superficial velocity being set higher than the minimum fluidization velocity of said fluidized medium; and
   said fluidized bed being a bubbling fluidized bed.

10. Carbon nanomaterial fabrication apparatus comprising:
- a fluidized bed reactor in which a tube or fiber shaped carbon nanomaterial having carbon as a main constituent is fabricated by reacting a compound that includes carbon and an additive that includes metal;
- wherein said fluidized bed reactor comprises a fluidized bed section and a free board section, said free board section having a larger flow path cross-sectional area than said fluidized bed section, and said free board section being provided on an upper exit side of said fluidized bed section.

11. A carbon nanomaterial fabrication apparatus comprising:
- a fluidized bed reactor in which a tube or fiber shaped carbon nanomaterial having carbon as a main constituent is fabricated by reacting a compound that includes carbon and an additive that includes metal;
- wherein said fluidized bed reactor comprises a fluidized bed reactor furnace which is filled with a fluidized medium having a specific gravity and particle diameter that is sufficiently larger than those of the carbon nanomaterial being fabricated;
- at least a compound that includes carbon, an additive that includes a metal and an inert gas supplied to said fluidized bed reactor furnace;
- a fluidized bed, formed by floating of said fluidized medium, maintained within a predetermined temperature range and a predetermined pressure range;
- the superficial velocity being set higher than the minimum fluidization velocity of said fluidized medium; and
- said fluidized medium comprises a plurality of species having different minimum fluidization velocities.

12. A carbon nanomaterial fabrication apparatus comprising a fluidized bed reactor in which a tube or fiber shaped carbon nanomaterial having carbon as a main constituent is fabricated by reacting a compound that includes carbon and an additive that includes metal, wherein the compound that includes carbon is a material that includes carbon and deposits the carbon thermodynamically.

13. A carbon nanomaterial fabrication apparatus comprising a fluidized bed reactor in which a tube or fiber shaped carbon nanomaterial having carbon as a main constituent is fabricated by reacting a compound that includes carbon and an additive that includes metal, wherein the additive that includes a metal is one or a plurality of compounds that include one or a plurality of iron (Fe), nickel (Ni) and cobalt (Co).

14. A carbon nanomaterial fabrication facility comprising:
- a carbon nanomaterial fabrication apparatus comprising a fluidized bed reactor in which a tube or fiber shaped carbon nanomaterial having carbon as a main constituent is fabricated by reacting a compound that includes carbon and an additive that includes metal;
- a raw material supply device that continuously supplies a predetermined amount of a compound that includes carbon to said carbon nanomaterial fabrication apparatus;
- an additive supply device that continuously supplies a predetermined amount of an additive that includes a metal to said carbon nanomaterial fabrication apparatus;
- a gas supply that continuously supplies a predetermined amount of an inert gas to said carbon nanomaterial fabrication apparatus; and
- a particle recovery device that recovers a carbon nanomaterial fabricated by said carbon nanomaterial fabrication apparatus.

15. The facility of claim 14, wherein said particle recovery device comprises at least one of a carbon nanomaterial trapping apparatus, a cyclone, and a filter.

16. The facility of claim 14, wherein a discharge gas processing device is provided downstream of said particle recovery device.

17. The facility of claim 16, and further comprising a gas concentration detecting device to detect a harmful gas concentration in discharged gas and to carry out operation control by associating a detection signal with a harmful gas concentration.

18. The facility of claim 16, wherein the entirety of said facility is accommodated in a closed space provided with a ventilation device.

* * * * *